(12) United States Patent
Chen et al.

(10) Patent No.: US 9,357,882 B2
(45) Date of Patent: Jun. 7, 2016

(54) REMOVABLE STIRRING SYSTEM FOR MIXING LIQUID

(71) Applicant: Electrical & Electronics Ltd., Hong Kong (CN)

(72) Inventors: Andrew Yuen Chin Chen, Hong Kong (CN); Amy Decem Cheng, Hong Kong (CN); Dick Tak Fung Leung, Hong Kong (CN); Raymond Wai Ming Wong, Hong Kong (CN)

(73) Assignee: EnE Holdings Ltd, Hong Kong (CN)

( * ) Notice: Subject to any disclaimer, the term of this patent is extended or adjusted under 35 U.S.C. 154(b) by 338 days.

(21) Appl. No.: 13/959,206

(22) Filed: Aug. 5, 2013

(65) Prior Publication Data

US 2014/0047985 A1    Feb. 20, 2014

Related U.S. Application Data

(60) Provisional application No. 61/682,869, filed on Aug. 14, 2012.

(51) Int. Cl.
*A47J 43/046* (2006.01)
*A47J 43/07* (2006.01)
*B01F 3/08* (2006.01)

(52) U.S. Cl.
CPC .......... *A47J 43/0465* (2013.01); *A47J 43/0716* (2013.01); *B01F 3/0853* (2013.01)

(58) Field of Classification Search
CPC . A47J 43/0465; A47J 43/046; A47J 43/0716; B01F 3/0853

USPC ................ 99/287, 323.1, 348; 366/273, 343, 366/325.6, 314; 261/84, 119.1, DIG. 26
See application file for complete search history.

(56) References Cited

U.S. PATENT DOCUMENTS

| 5,074,201 | A | * | 12/1991 | Takeyama et al. | 99/483 |
| 7,314,307 | B2 | * | 1/2008 | Cai | 366/273 |
| 7,748,893 | B2 | * | 7/2010 | Yaniv et al. | 366/273 |
| 8,887,628 | B2 | * | 11/2014 | Cai | 99/484 |

FOREIGN PATENT DOCUMENTS

| CN | 102160761 A | 8/2011 |
| CN | 202355274 U | 8/2012 |
| CN | 202981697 U | 6/2013 |
| GB | 2486872 A | 7/2012 |
| WO | WO 2009135758 A1 | 11/2009 |

(Continued)

OTHER PUBLICATIONS

Jan. 2, 2014 International Search Report, Int'l App'l No. PCT/IB2013/056628.

(Continued)

*Primary Examiner* — Reginald L Alexander
(74) *Attorney, Agent, or Firm* — Law Offices of Albert Wai-Kit Chan, PLLC

(57) ABSTRACT

The present invention provides an appliance for preparing frothed or mixed beverage. In one embodiment, the appliance comprises a removable transparent or translucent liquid food container, and a stirrer and stirrer holder that are positioned inside the liquid food container. The stirrer includes magnetic elements so that it can be driven magnetically by a motor without any physical linkage.

18 Claims, 7 Drawing Sheets

(56) References Cited

FOREIGN PATENT DOCUMENTS

| WO | WO 2009135759 | A1 | 11/2009 |
| WO | 2014027315 | A1 | 2/2014 |

OTHER PUBLICATIONS

Jan. 2, 2014 Written Opinion of the International Searching Authority, Int'l App'l No. PCT/IB2013/056628.

* cited by examiner

US 9,357,882 B2

REMOVABLE STIRRING SYSTEM FOR MIXING LIQUID

FIELD OF THE INVENTION

This invention relates to an appliance for heating, stirring and frothing beverage.

BACKGROUND OF THE INVENTION

Conventional appliances for heating, mixing or stiffing of liquid food, such as a milk frother, usually consist of a container, a magnetic stirring system and a heating system. During normal operation, the magnetic stirrer must be secured properly to a shaft or pole while it is rotating, but the stirrer must be removable for cleaning. In order to aerate the beverage to create foam, the magnetic stirrer revolves around a cylindrical stub shaft or pole protruding from the bottom of the container. The rotating motion of the shaft or pole is driven by the magnetic field being inducted by the magnetic plate installed in a milk frother. For conventional milk frothers, even if the container is removable for cleaning, a shaft/pole is built into the bottom of the container to secure the stirrer in place. Sometimes, the stirrer can be very difficult to remove or to replace, and it would be difficult to clean the stirrer, especially since it is located at the bottom of the container.

SUMMARY OF INVENTION

In one embodiment, the present invention provides a device for mixing liquid food or beverage, the device comprising: a liquid container; a removable stirring system which comprises a stirrer, wherein the stirrer is placed inside a stirrer holder which presses against the wall of the base of the liquid container; and a base body comprising mechanisms for controlling stirring and heating in the liquid container. In one embodiment, the liquid container is partially or completely made of transparent or translucent material; for example, glass or plastics.

In one embodiment, the stirrer of the above device is capable of creating foam (e.g. see FIG. 6). In one embodiment, the stirrer holder is designed to reduce the diameter of frothing area or reduce the liquid volume being frothed in order to enhance the effectiveness of the frothing effect and quality of froth. In another embodiment, the stirrer is fixed to the stirrer holder. In general, the stirrer and the stirrer holder are easily removed for cleaning or changing.

In one embodiment, the base of the liquid container is capable of conducting heat and the base body is capable of controlling heat. For example, the bottom of the liquid container is flat and no fixed shaft is required to support the stirrer.

In one embodiment, the base body comprises a detector capable of detecting the presence of the liquid container and temperature changes. For example, the detector comprises a temperature sensor and the detector can also be used as a latch to trigger a micro switch to detect the existence of the liquid container.

DETAILED DESCRIPTION OF THE INVENTION

It is an object of the present invention to provide an appliance with a new stirrer holder for ease of cleaning, ease of installation and un-installation.

It is another object of the invention to make use of the new stirrer holder to position the stirrer.

It is another object of the invention to enhance the result of foam creation.

It is another object of the invention to provide a simple solution for cleaning after heating and/or stiffing the liquid food/beverage in the device by using a flat underside bottoms for the liquid container.

It is another object of the invention to provide a transparent or translucent milk or liquid container to enhance visual monitoring of the heating and/or stiffing processes.

It is another object of the invention to have a liquid container that can be completely detachable from the base body with any kind of built-in heating system for easy cleaning.

It is another object of the invention to provide a single button or detector that can sense both the temperature and the presence of a liquid container.

In one embodiment, the present invention provides a device comprising:
(i) A liquid food container that is partially or completely made out of glass or transparent or translucent material;
(ii) A magnetic stirrer with an additional stirrer holder;
(iii) A base body including a heating system, an electronic control, a motor connected to a plate with built-in magnet, a temperature sensor and/or temperature regulator, and a micro switch for cup detection.

In one embodiment, the liquid container is designed to have a warming plate at the bottom to ensure good heat conductivity. The body part of the liquid container is made out of glass or transparent or translucent material in order to let the user monitor the entire operation. The body part and the bottom part can be attached together by screws, glue or mechanically rimmed along the edge. Silicon or rubber can be used as sealant.

During normal operation, the stirrer, which is housed inside the stirrer holder, rotates according to the magnetic field generated by the magnetic plate in the base body. Both the stirrer and the stirrer holder are placed inside the liquid container.

Figure 6:
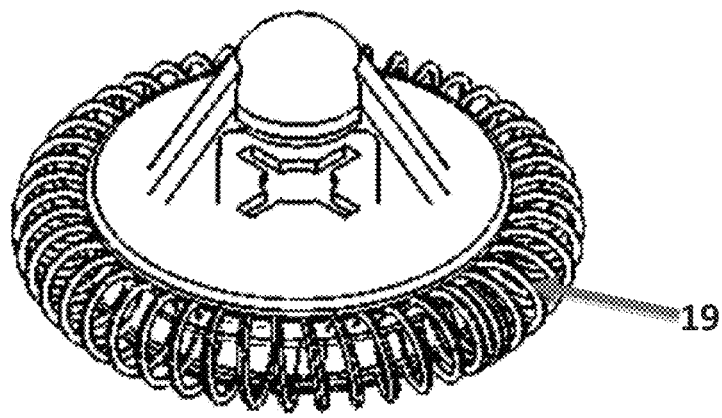
FIG. 6 shows a perspective view of one embodiment of the frothing stirrer.

In one embodiment, the stirrer comprises a spring wrapping around a circular surface, this stirrer mainly for frothing or foaming liquid food (see FIG. 6). In another embodiment, the stirrer is circular with a bare surface, this stirrer mainly for mixing or spinning the food without froth or foam creation (see FIG. 7). In yet another embodiment, the stirrer looks like an "octopus", this stirrer mainly for frothing or foaming the liquid food. (see FIG. 8).

The stirrer holder is used to contain the stirrer. In essence, the holder needs to press against the liquid container as there is a small undercut (or bump) to locate the holder. The removal/refitting of the stirrer holder in the device is very easy.

To maximize the froth or foam creation, the minimum requirement is: the heating surface is connected with a power source of 12 watts or above. Preferably, the stirrer is rotationally driven at a speed of at least 1500 revolutions/minutes.

The stirrer holder and stirrer mentioned above can easily be removed from the liquid container for cleaning purpose. In order to facilitate this feature without having a permanent shaft or a pole attached to the lower side of the liquid container, there is a small undercut (or bump) to locate the holder. The small undercut provides a positioning and locking function so that the stirrer holder would not detach from the proper position during normal operation. Based on the above design, a permanent shaft or pole is no longer necessary; therefore, the container would have an easy to clean flat bottom. An added advantage of the removable liquid container is dishwasher safe.

The base body may contain a detector. In one embodiment, said detector is a button or device, comprising both temperature sensor and micro switch, and is built into the base body to provide continuous feedback to a circuitry to regulate the motor as well as the heater.

In one embodiment, the present invention provides a device for mixing liquid food or beverage, the device comprising: (i) a liquid container detachable from a base body; (ii) a stirring system detachable from said liquid container, said stirring system comprises a stirrer with at least one magnet, wherein said stirrer is housed inside a stirrer holder that is configured to press against the inside wall of the base of the liquid container, said stirring system is designed to enhance the effectiveness of frothing and quality of froth by frothing only the liquid volume near the axis of the stirrer; and (iii) a base body comprising mechanisms for controlling stirring and heating in the liquid container. In one embodiment, the stirrer and the stirrer holder is reversibly or irreversibly attached. In another embodiment, the stirrer holder is held inside the liquid container by one or more structures on the vertical surface of said stirrer holder. For example, said structure can be one or more of undercuts, bumps or small buckles.

In one embodiment, the bottom of the liquid container is flat and does not comprise a fixed shaft to support the stirrer.

In one embodiment, the stirrer holder comprises a shaft for mounting the stirrer. In one embodiment, the stirrer is locked to the stirrer holder by an interlock at said shaft.

In one embodiment, the base body of the above device comprises a rotating motor and one or more magnets connected to the motor, wherein the base body controls the stirrer in the liquid container by remotely driving said stirrer with the magnets connected to the motor. In another embodiment, the base body further comprises a heater, a warming plate, a micro switch and one or more detectors. In one embodiment, the detectors comprise a temperature sensor such as a thermistor or thermostat.

In another embodiment, the base body of the device controls heating in the liquid container by turning the heater on and off when a pre-determined temperature is detected at the warming plate by the detector. In one embodiment, said detector transmits motion to said micro switch when the liquid container is placed on the base body to trigger the heating and stirring process. In one embodiment, a single detector is capable of both monitoring the temperature of the liquid container and transmitting motion to the micro switch when the liquid container is placed on the base body to trigger the heating and stirring process. In another embodiment, a first detector monitors the temperature of the liquid container and a second detector transmits motion to the micro switch when the liquid container is placed on the base body to trigger the heating and stirring process.

In one embodiment, the base body of the device further comprises an on/off button, a thermistor, and software for monitoring time of heating or stirring.

In one embodiment, interchangeable stirrers or preassembled stirrer/stirrer holder sets are used to achieve different froth density.

In one embodiment the stirrer comprises a spring wrapping around a circular surface. In another embodiment, the stirrer is circular in shape with a bare surface.

EXAMPLE 1

Embodiments of the Device

Figure 1:
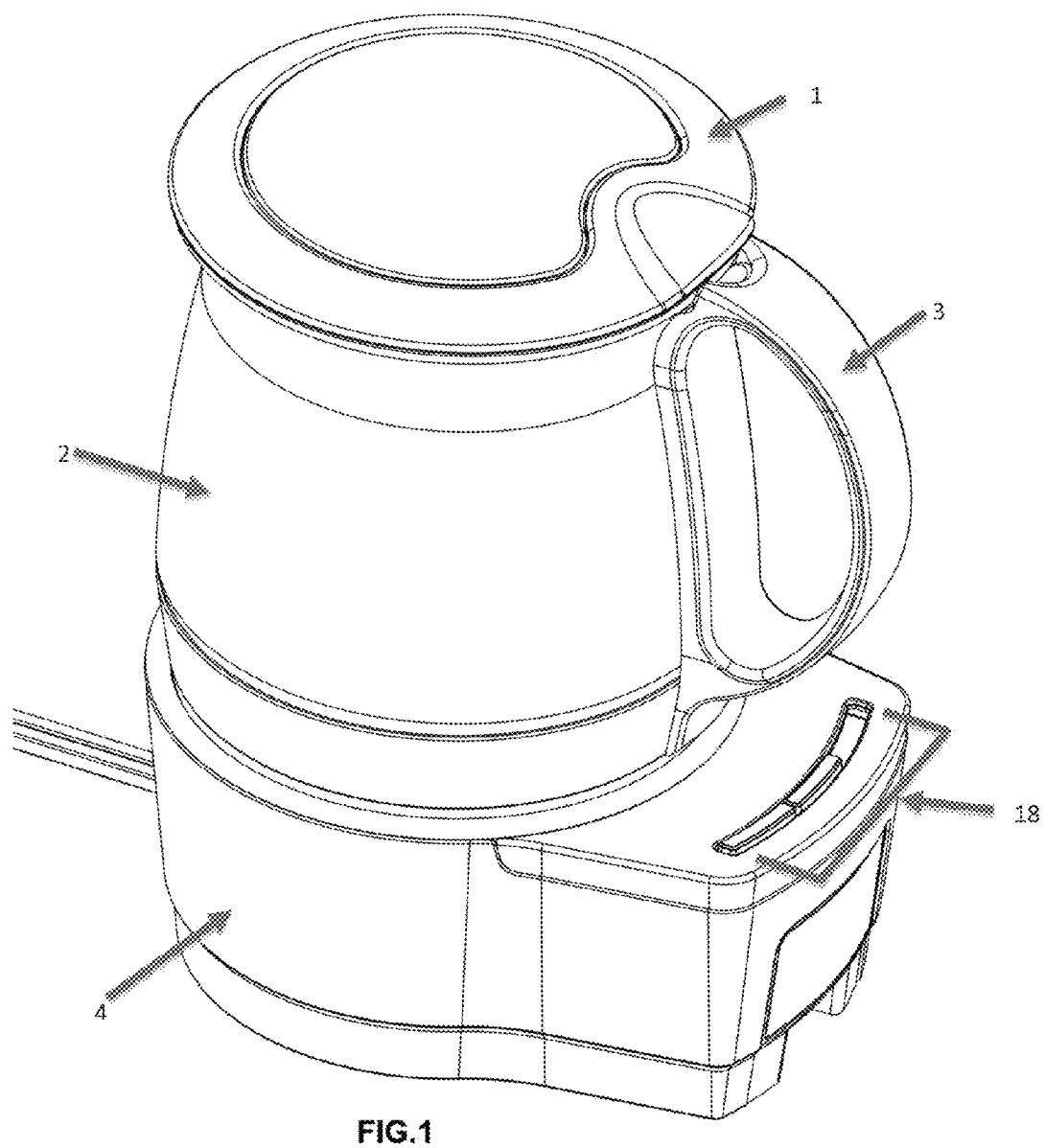
FIG. 1 shows a perspective view of the device according to one embodiment of the invention.
Figure 2:
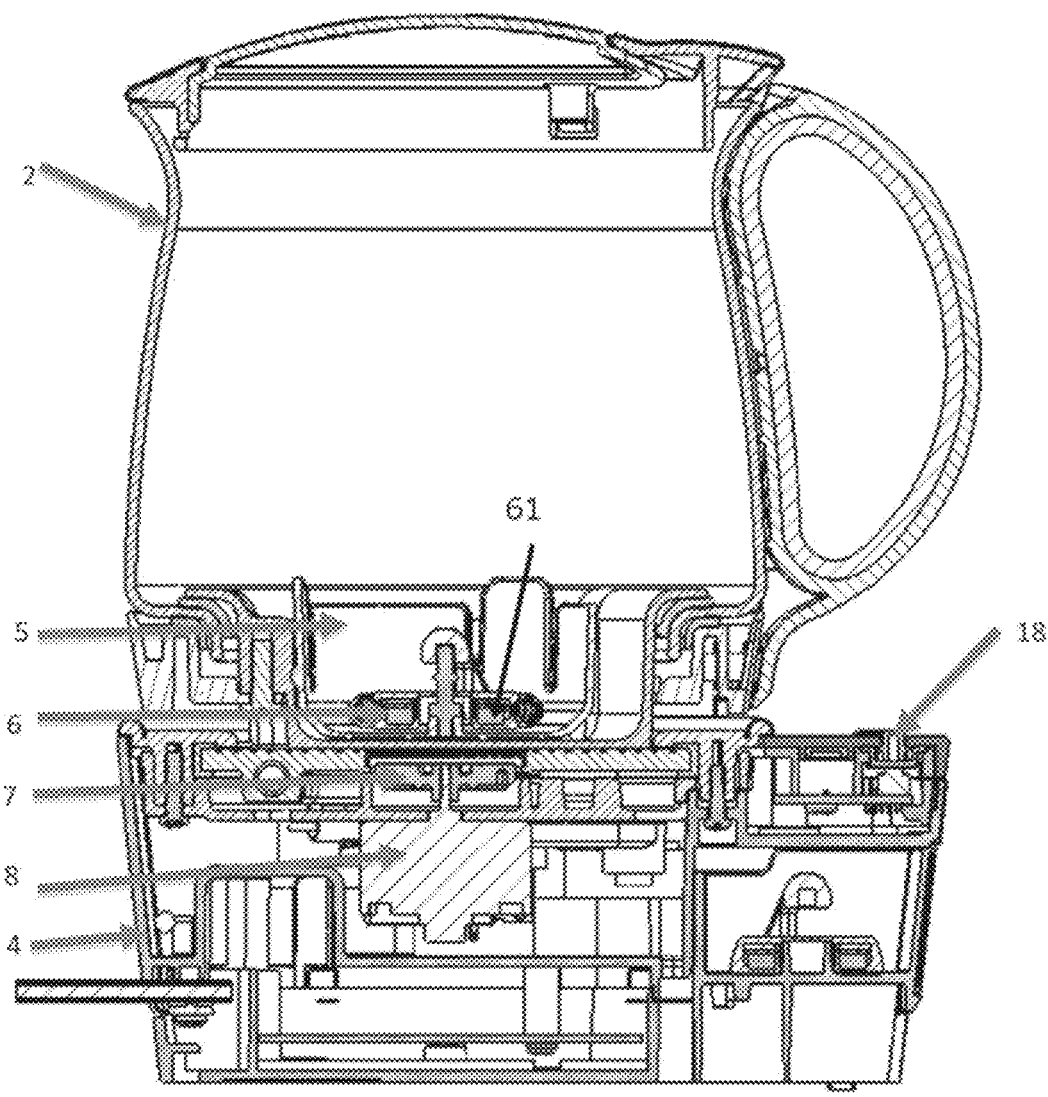
FIG. 2 shows a section view of one embodiment of the invention.
Figure 3:
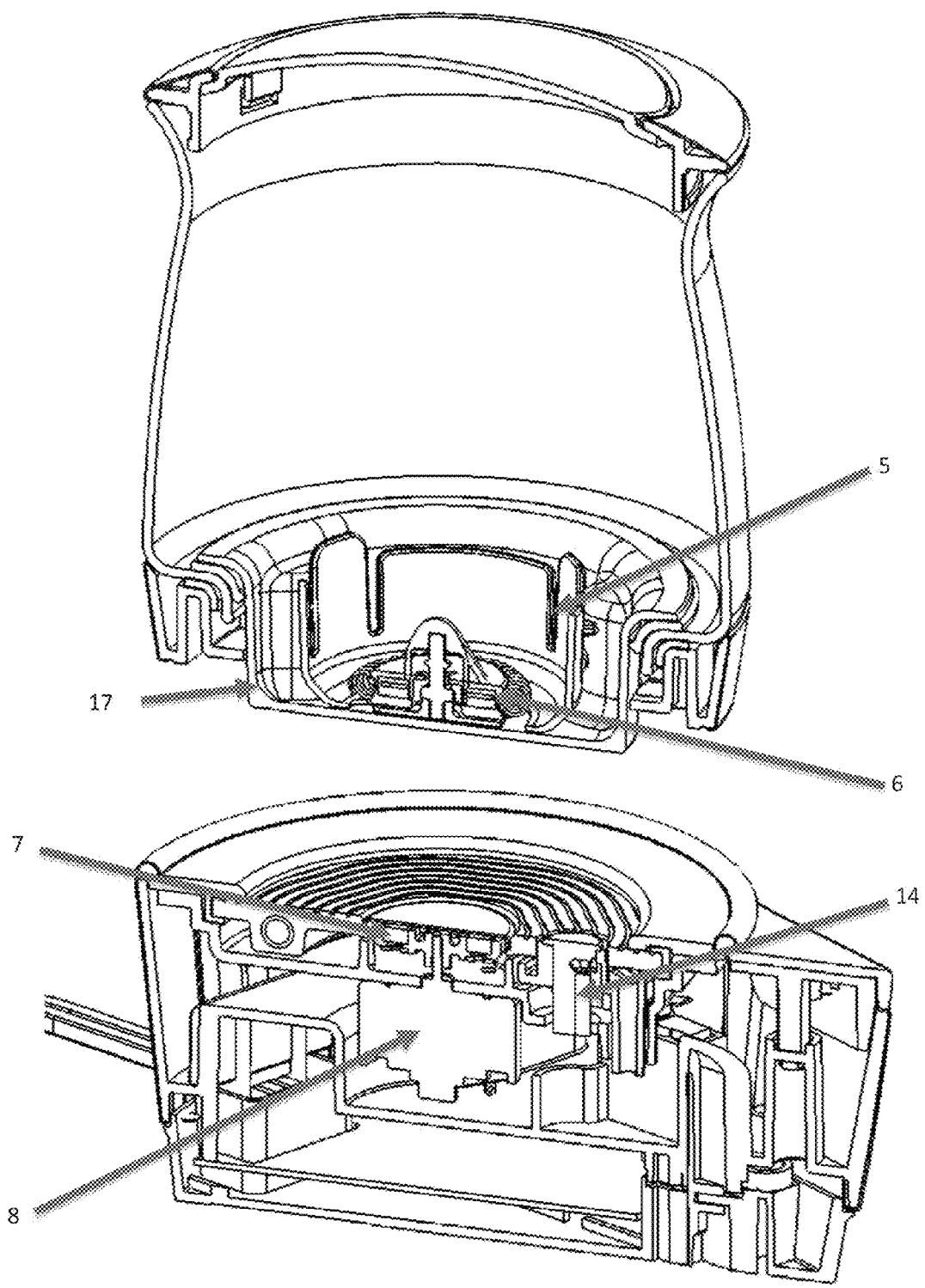
FIG. 3 shows an exploded section perspective view of one embodiment of the invention.

The configuration of one embodiment of this invention is shown in FIG. 1. The liquid container (2) is placed on top of a base body (4). The liquid container (2) is removable and the carafe handle (3) is connected to the liquid container (2) by glued or mechanical method or the carafe handle (3) is an extended part of the liquid container (2). The transparent or translucent lid (1) covers the opening of the liquid container (2). The base body (4) comprises a warming plate (13), a rotating motor (8), a detector (14) such as thermistor and/or thermostat to control the on and off of the heating system so as to regulate the temperature. The button (18) is mainly for mode selection, every mode presents a target temperature. In one embodiment, a user presses a button, then the appliance would start automatically until the liquid food inside the liquid container reaches the desired temperature.

In one mode of operation, the stirrer (6) and stirrer holder (5) are placed inside the liquid container (2) before a user pours any liquid into the liquid container (2). Then the user puts the liquid container (2) on top of the warming plate (13) of the base body (4) in order to get ready for frothing or stirring. Once the user turns on the appliance, e.g. by pressing a button (18), the stirrer would be driven remotely by the magnetic plate (7) which is connected to the motor (8). The motor is placed inside the base body (4). Heat would be transferred from the base body (4) through the direct contact between warming plate (13) and the liquid container (2).

Since the liquid container (2) is removable, in order to avoid having the appliance operated without the liquid container (2), the base body (4) comprises a detector (14) for liquid container detection and monitoring of temperature. When the liquid container (2) is put on top of the base body (4), the detector (14) is pushed downward and activates the micro switch (15) so the whole heating and stirring processes start. In one embodiment, the detector comprises a thermistor for temperature sensing of the warming plate (13) as there is correlation in temperature between the warming plate (13) and the liquid food inside the liquid container (2). When the user removes the liquid container (2), the appliance stops thereafter. In the above arrangement, a single detector performs both functions of detecting the liquid container and monitoring the temperature. In another embodiment, the above two parameters can be detected by separate detectors.

Figure 4:
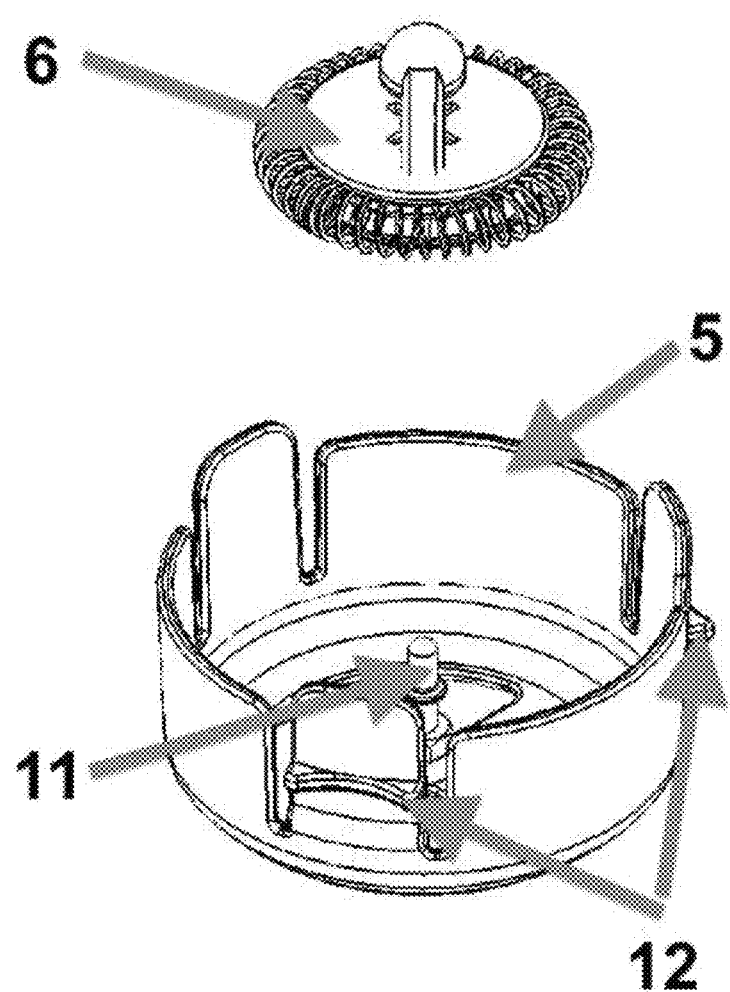
FIG. 4 shows an exploded perspective view of one embodiment of the stirrer and stirrer holder.
Figure 5:
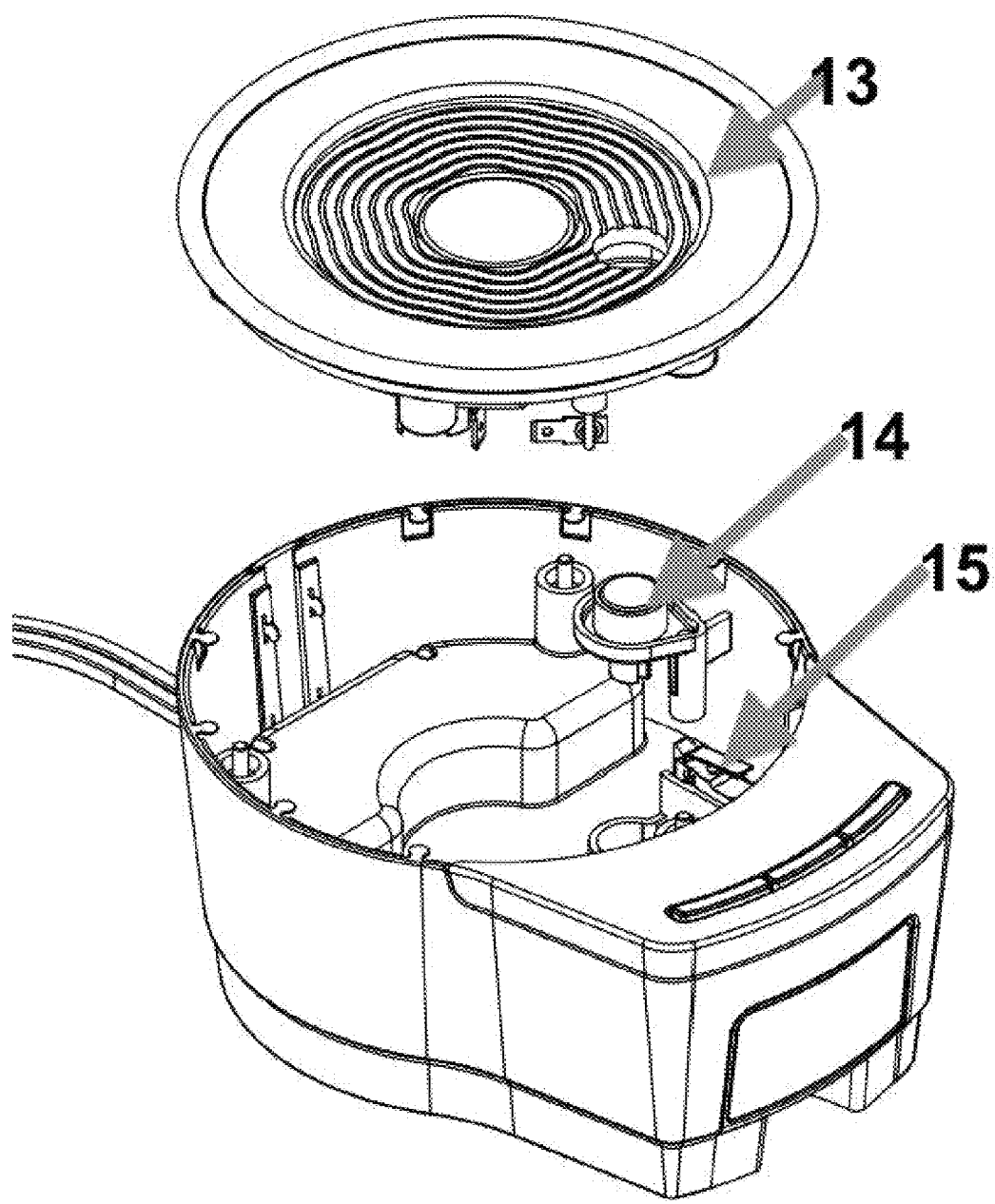
FIG. 5 shows an exploded perspective view of one embodiment of the base body

The stirrer (6) or the stirrer holder (5) shown in FIG. 4. are removable and they are both magnetic. The whole assembly of stirrer and stirrer holder can be removed from the liquid food container (2) for cleaning. The stirrer holder (5) comprises a shaft (11) for locking the stirrer in place. In one embodiment, the stirrer holder (5) is made of plastic. The stirrer (6) and the stirrer holder (5) can be separated easily by hand. The whole assembly is placed inside the liquid food container (2) and the stirrer holder (5) will be briefly held in place by some small buckles (12) on the vertical surface. During operation, only the stirrer (6) rotates according to the magnetic field induced by the magnetic plate (7). The stirrer holder (5) does not rotate with the stirrer (6) but it would only hold the stirrer in place. Since the stirrer holder does occupy certain volume of the effective frothing space, the loading of the stirrer holder in the container would reduce the space available for frothing, thereby increasing the effectiveness of the frothing process. For example, in one embodiment, the inside diameter of the liquid container is 75 mm, and the stirrer holder diameter is 55 mm. Common designs in the art tend to have an as large as possible container base to increase heat transfer performance, but such a design decreases the effectiveness of the frothing. Fluid velocity is known to be inversely proportional to the distance from the axis of the stirrer and, therefore, the stirrer in the stirrer holder of the present invention which has a reduced diameter would be frothing only in the area near to the axis where fluid velocity is high and frothing is effective. Experimental results show that such stirrer reduced the area of the frothing space and improved the frothing effect.

The shaft (11) can be welded, riveted or screwed to the stirrer holder, acting as the axis of the stirrer. The stirrer (6) comprises at least one magnet (61) set, whereas the magnetic plate (7) which is connected to the shaft of the motor (8) also comprises at least one magnet set. When the motor rotates, at least one magnetic field would bring along the stirrer rotating. In one embodiment, the magnet size is 5 mm ×5 mm×3 mm, the motor size is 32 mm in diameter and 25 mm thick.

EXAMPLE 2

Embodiments of Liquid Container

In one embodiment related to the liquid container, it comprises plastic container, metal base, handle, and container cover. For the plastic container, it is partially or completely made out of transparent or translucent material, for example, PC, PES, copolyester, and it can be solid color of plastic as well. The plastic container is connected to a flat underside bottom for heat transfer. The flat bottom is made out of metal or any casting material. The body part and the bottom part can be attached together by screws, glue or mechanically rimmed along the edge. Silicon or rubber can be used as sealant. In another embodiment, the liquid container is made of glass, whether it is transparent, translucent or colored glass.

The flat underside bottom provides a simple solution for cleaning after heating and/or stirring the liquid food/beverage. The liquid container is connected to a handle, the handle can be a separated part with any kind of material or it is jointed together with liquid container itself, for example the liquid container and the handle are injected into one single part.

In another embodiment of liquid container, it is completely made out of metal materials, with a flat underside bottom and a handle. This liquid container is designed to be one piece to provide for easy cleaning.

Example 3

Embodiments of Stirrer Assembly

In one embodiment, the stirrer holder comprises holder shaft and stirrer. The stirrer can be different shape and different materials but they all include magnets inside the stirrers. The rotating motion of the stirrer is driven by the magnetic field being induced by the magnetic plate installed in the base body. Various stirrers provide different features and result. In one embodiment, the stirrer comprises a spring (19) wrapped around a circular stirrer (see FIG. 6). When such stirrer rotates inside the liquid, it creates more friction to generate a larger vortex and the air can get inside the liquid easily. As a result, the liquid or beverage is frothed by the rotating cycle.

Figure 7:
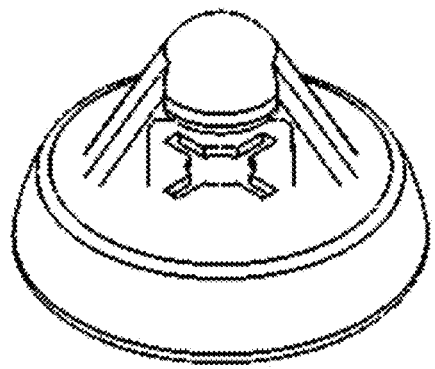
FIG. 7 shows a perspective view of one embodiment of the mixing stirrer.

In another embodiment, the stirrer is circular in shape with a very clean surface (see FIG. 7). When it rotates inside the liquid, it generates a small vortex compared with the spring type stirrer. This type of stirrer is used for mixing or stirring but not for creating froth.

Figure 8:
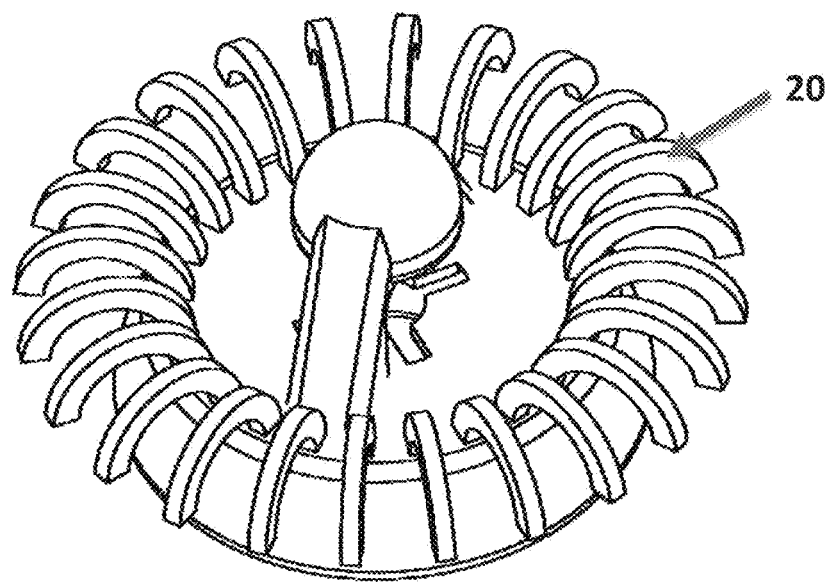
FIG. 8 shows a perspective view of another embodiment of the mixing stirrer.
Figure 9:
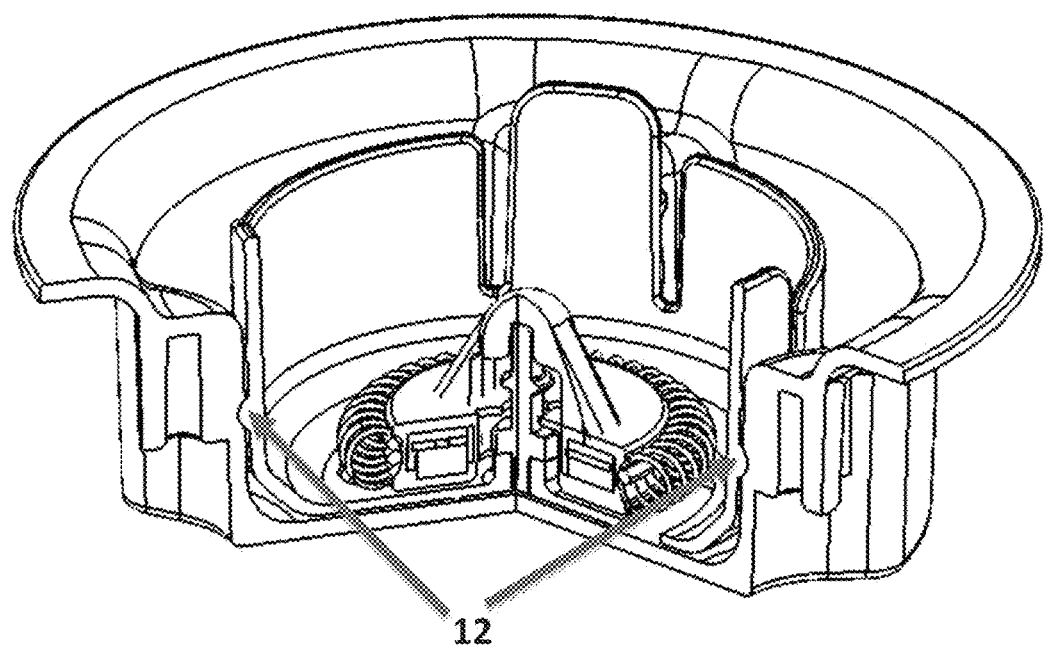
FIG. 9 shows a section view of on embodiment of assembly of the stirrer, stirrer holder and the container base.

In yet another embodiment, the stirrer looks like an "octopus", with at least one extension (20) extending around the stirrer (see FIG. 8). The main function for the extensions (20) is to create more friction to generate a larger vortex and let the air gets inside the liquid easily. As a result, the liquid or beverage is frothed by the rotating cycle. More extension (20) can create richer froth or foam, but the rotation speed might decrease due to increased friction in the liquid food. In this case, a motor with higher power would be needed in order to overcome the friction.

In one embodiment, the stirrer inside the stirrer holder is locked to the stirrer holder by an interlock at the shaft. It provides interchangeability of different stirrers. The stirrer holder is made out of plastic or metal, for example aluminum or aluminum alloy, and it can easily be removed from the liquid food container for cleaning purpose. In one embodiment, in order to facilitate this feature without having a permanent shaft or a pole attached to the lower side of the liquid food container, there is a small undercut (or bump) (12) to locate the holder. The small undercut provides a positioning and locking function so that the stirrer holder would not detach from the proper position during normal operation.

In other embodiment, the stirrer holder and stirrer are fixed together and became an assembled type. This would provide convenience for the user because the user can just change the whole saner holder assembly for different purposes.

EXAMPLE 4

Embodiments of Base Body

In one embodiment, the base body includes a detector comprising both a temperature sensor and a micro switch. The detector is built into the basebody, to provide continuous feedback to a circuitry to regulate the motor as well as the heater. Since the liquid container is removable, in order to avoid having the appliance operated without the liquid container, the whole heating and stirring processes would start only when the sensor is pushed downward and activates the micro switch. The detector also acts as a temperature sensor of the warming plate as there is correlation in temperature between the warming plate and the liquid food inside the liquid container. In another embodiment, separate sensors or detectors can be used to detect the presence of the liquid container and monitor the temperature of the food/liquid.

In another embodiment, the base body does not include the above mentioned detector. Thus, the base body does not provide liquid container placement sensor and food temperature regulation. In this embodiment, the machine used one button to control on and off. The heater connected to the warming plate is controlled by a thermistor and a software. The software also monitors time compensation to make sure the liquid food inside the liquid container is not over- or under-cooked.

What is claimed is:

1. A device for mixing liquid food or beverage, the device comprising:

(i) a liquid container comprising a bottom with a surface, said surface comprises an opening that connects to a frothing compartment below the surface of said bottom, and said opening has a diameter that is smaller than that of said bottom, wherein said liquid container is detachable from a base body, said base body comprises mechanisms for controlling stirring and heating in the liquid container; and (ii) a stirring system detachable from the frothing compartment of said liquid container, said stirring system comprises a stirrer with at least one magnet, wherein said stirrer is housed inside a stirrer holder that is configured to press against the inside wall of the frothing compartment of the liquid container, said stirrer will froth only liquid food or beverage inside said frothing compartment.

2. The device of claim 1, wherein the stirrer and the stirrer holder is reversibly or irreversibly attached.

3. The device of claim 1, wherein the stirrer holder is held inside the frothing compartment by one or more structures on the vertical surface of said stirrer holder.

4. The device of claim 3, wherein said structure can be one or more of undercuts, bumps or small buckles.

5. The device of claim 1, wherein the bottom of the liquid container is flat and does not comprise a fixed shaft to support the stirrer.

6. The device of claim 1, wherein the stirrer holder comprises a shaft for mounting the stirrer.

7. The device of claim 6, wherein the stirrer is locked to the stirrer holder by an interlock at said shaft.

8. The device of claim 1, wherein the base body comprises a rotating motor and one or more magnets connected to the motor, wherein the base body controls the stirrer in the liquid container by remotely driving said stirrer with the magnets connected to the motor.

9. The device of claim 1, wherein the base body further comprises a heater, a warming plate, a micro switch and one or more detectors.

10. The device of claim 9, wherein the detectors comprise a temperature sensor.

11. The device of claim 9, wherein said base body controls heating in the liquid container by turning the heater on and off when a pre-determined temperature is detected at the warming plate by the detector.

12. The device of claim 9, wherein the detector transmits motion to said micro switch when the liquid container is placed on the base body to trigger the heating and stirring process.

13. The device of claim 9, wherein a single detector is capable of both monitoring the temperature of the liquid container and transmitting motion to the micro switch when the liquid container is placed on the base body to trigger the heating and stirring process.

14. The device of claim 9, wherein a first detector monitors the temperature of the liquid container and a second detector transmits motion to the micro switch when the liquid container is placed on the base body to trigger the heating and stirring process.

15. The device of claim 1, wherein the base body further comprises an on/off button, a thermistor, and software for monitoring time of heating or stirring.

16. The device of claim 1, wherein interchangeable stirrers or preassembled stirrer/stirrer holder sets are used to achieve different froth density.

17. The device of claim 1, wherein the stirrer comprises a spring wrapping around a circular surface.

18. The device of claim 1, wherein the stirrer is circular in shape with a bare surface.

* * * * *